May 21, 1929.　　　　B. MEISLER　　　　1,714,313
APPARATUS FOR AUTOMATICALLY PEELING AND WASHING FRUITS AND VEGETABLES
Filed July 5, 1924　　　4 Sheets-Sheet 1
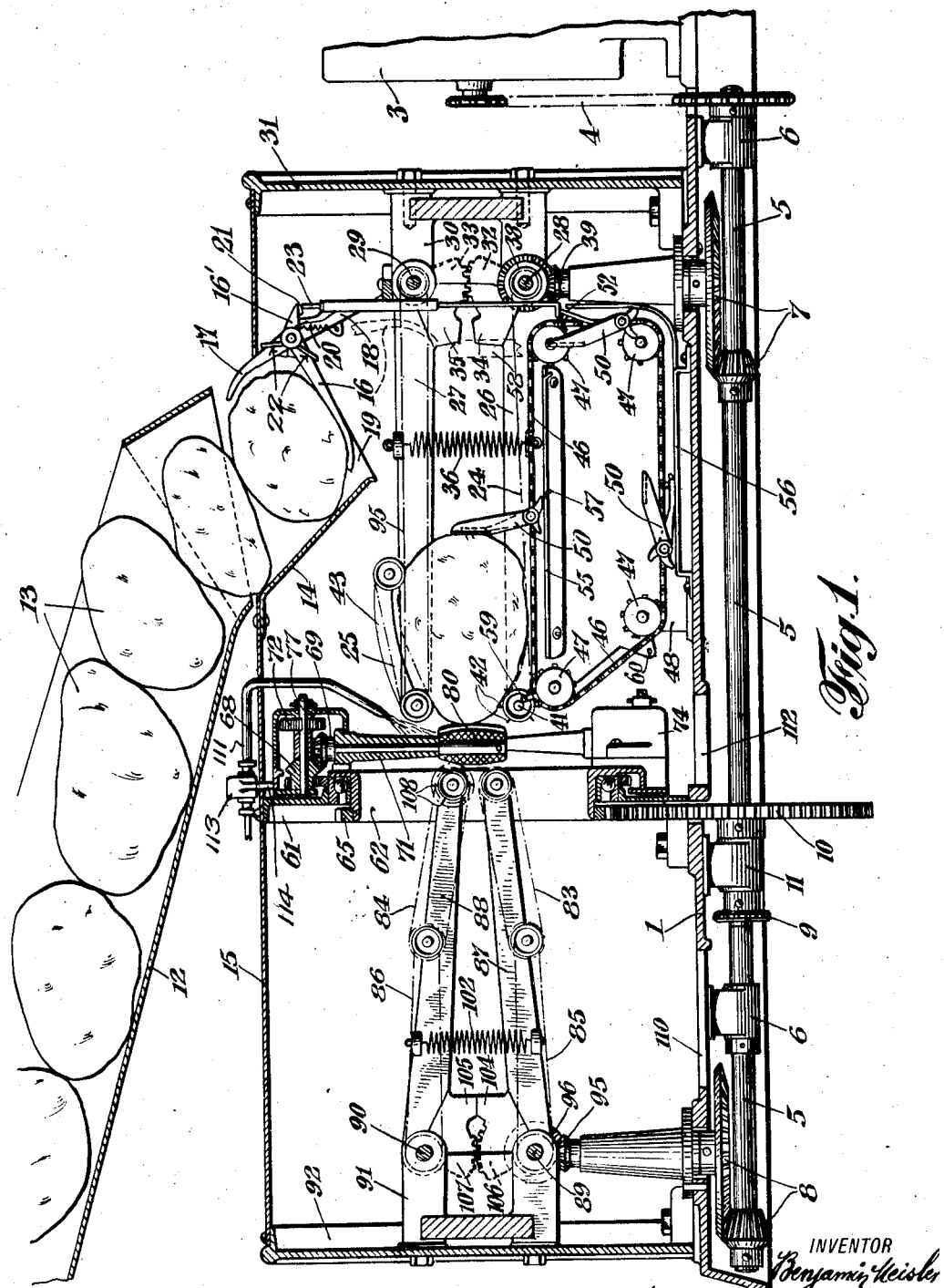
INVENTOR
Benjamin Meisler
BY Prager & Amon
ATTORNEYS May 21, 1929.  B. MEISLER  1,714,313
APPARATUS FOR AUTOMATICALLY PEELING AND WASHING FRUITS AND VEGETABLES
Filed July 5, 1924    4 Sheets-Sheet 2
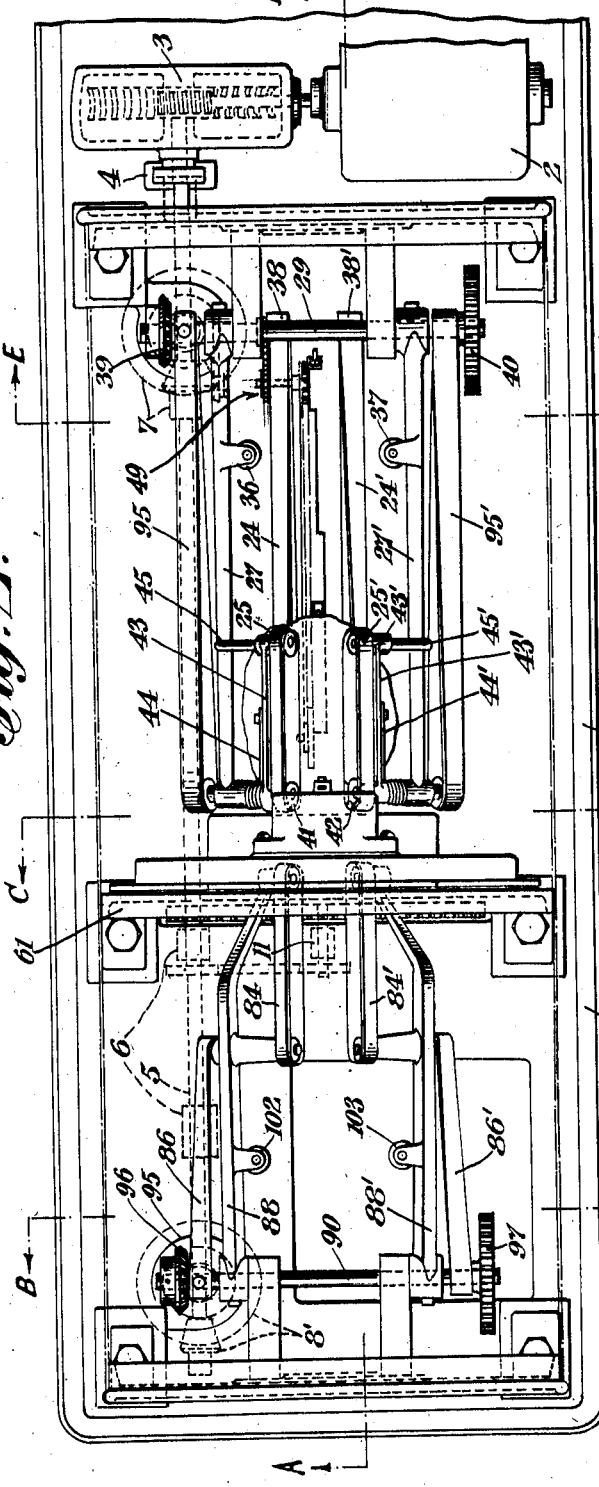
INVENTOR
Benjamin Meisler
BY
Prager & Amon
ATTORNEYS

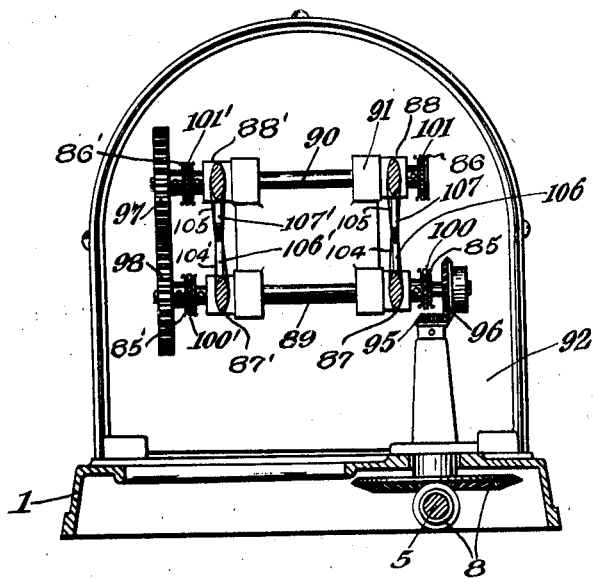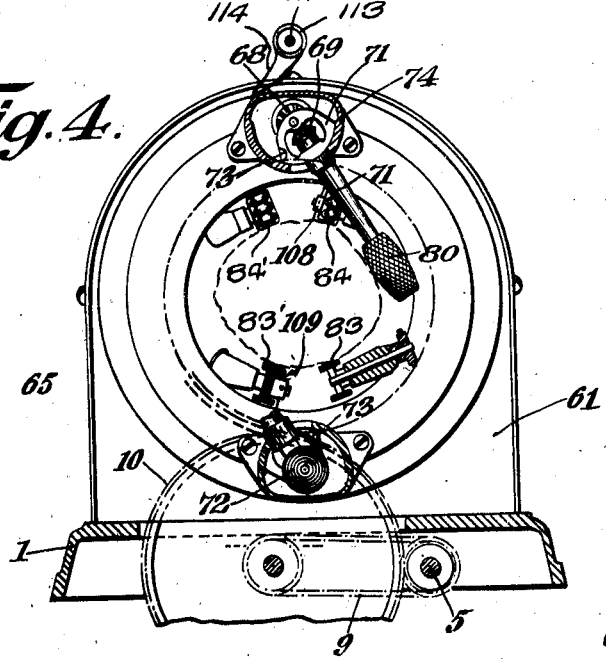

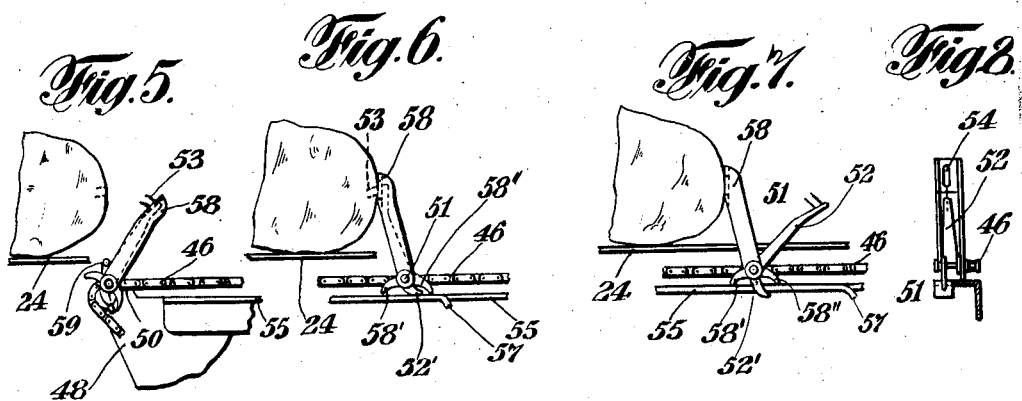
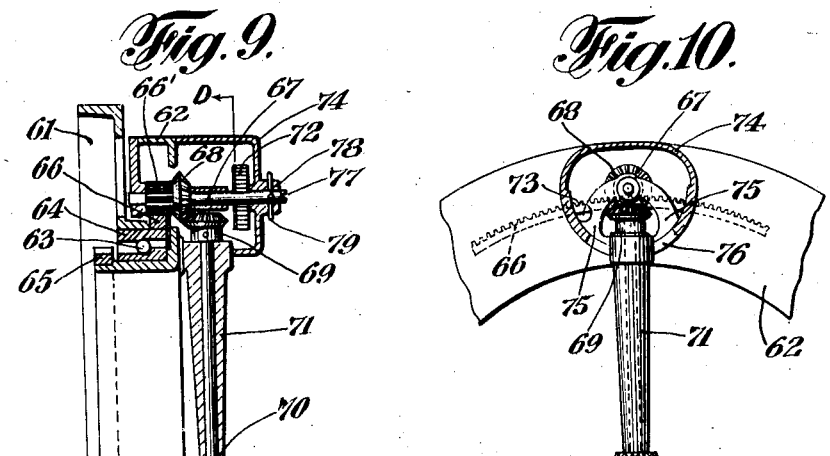

Patented May 21, 1929.

1,714,313

UNITED STATES PATENT OFFICE.

BENJAMIN MEISLER, OF NEW YORK, N. Y.

APPARATUS FOR AUTOMATICALLY PEELING AND WASHING FRUITS AND VEGETABLES.

Application filed July 5, 1924. Serial No. 724,524.

My invention relates to improvements in the method and apparatus for automatically peeling and washing fruits and vegetables.

The objects of my invention are:

1. To produce an apparatus that perfectly and automatically removes the entire skin of fruits and vegetables as potatoes, carrots, cocoanuts, etc.

2. To provide means to entirely automatically charge, peel, wash and discharge the fruit or vegetable to be treated.

3. To provide arrangements to permit the removal of the surface skin of fruits and vegetables regardless of shape or size of same.

4. To provide a specially designed revolving non-metallic skin removing tool, so arranged as not only perfectly but also economically peel off the surface skin of fruits and vegetables.

5. To provide means to facilitate the removal of the surface skin, and also thoroughly and sanitarily wash the fruit or vegetables.

The invention consists of the novel combination, constructions, and arrangement of various elements and parts, as fully described in this specification and shown in the accompanying drawings in which:

Fig. 1 is a sectional side elevation along line A—A' (Fig. 2) of a fruit and vegetable skin peeling apparatus.

Fig. 2 is a plan view with cover removed.

Fig. 3 is a sectional view along line B—B (Fig. 2).

Fig. 4 is a sectional view along line C—C' (Fig. 2).

Figs. 5, 6, 7 and 8 are enlarged views showing the various operating positions of parts of the automatic feeding mechanism.

Fig. 9 is an enlarged section showing the skin peeling tool-operating mechanism.

Fig. 10 is a sectional view along line D—D' of Fig. 9.

Fig. 11 is a sectional view along line E—E' (Fig. 2).

Similar numerals refer to similar parts throughout the several views.

1. Description of machine.

The machine may be grouped into its functional parts as follows:
1. The driving mechanism.
2. The charging mechanism.
3. The feeding mechanism.
4. The peeling mechanism.
5. The discharging mechanism.
6. The washing attachment.

The driving mechanism.

This mechanism is clearly illustrated in Figures 1, 2, 3 and 4 and consists of a motor 2, a reduction gear arrangement 3, driven by motor 2, a belt or chain transmission 4, transmitting power to a shaft 5 running in suitable bearings 6. Bevel gear drives 7 and 8 for operating the feeding and discharge mechanism respectively, are provided, while the skinning mechanism is operated by a combined chain and gear drive 9 and 10 for which another bearing 11 is mounted upon the common base plate 1.

2. The charging mechanism.

An inclined and preferably vibrating chute 12, Fig. 1 serves the purpose of automatically moving the fruit or vegetable 13, into the stationary charging pocket 14, permanently attached to cover 15, of the machine. A release attachment, consisting of a lever 16, provided with an operating nose 16', and a locking lever 17, pivoted upon a supporting bracket 18, is so arranged as to normally close the lower opening 19, of charging pocket 14. A spring 20, attached to operating nose 16', and bracket 18, is pulling lever 16, into its normal position, which is determined by a stop 21, forming part of bracket 18. Another spring 22, serves the purpose of keeping levers 16 and 17, in engagement as shown in Fig. 1. The functioning of this release attachment is as follows: When operating rod 23, is moved up it engages with nose 16', and moves lever 16, into position indicated in dotted lines (Fig. 1). During this process locking lever 17, is pulled along till it engages with the fruit or vegetable to be peeled and slides along its surface, thereby wedging itself against the following fruit or vegetable, thus permitting the fruit or vegetable to be peeled to drop off while the following is locked in position. This process is reversed when operating rod is moving down, lever 17, returns into its normal position thereby unlocking the following fruit or vegetable, which then moves forward into the position occupied by the previous fruit or vegetable.

3. The feeding mechanism.

The feeding mechanism consists of two distinctive parts, (a) the conveying part and (b) the feeder part.

(a) The conveying part.

This part is composed of the lower, long conveying bands or chains 24 and 24', (Figs. 1, 2 and 11) and the upper short conveying bands or chains 25 and 25', shown in dash dotted lines in Fig. 1. These conveyor bands are attached at the extreme ends to the lower and upper arms 26—26' and 27—27', which in turn are pivoted to shafts 28 and 29, mounted on bearing 30, which again is fastened upon the end plate 31. Pivoted arms 26—27, and 26'—27' are geared together at 32—32' and 33—33' for centralizing purposes. Stops 34—34' and 35—35' are provided to limit the pulling action of springs 36 and 37, fastened to the respective levers.

The lower conveying bands 24 and 24' are driven directly from shaft 28, by sprockets 38 and 38', fastened thereon (see Fig. 11).

Shaft 28 is driven from main shaft 5, by bevel gear pairs 7, and 39, while a pair of spur gears 40, transmit power to shaft 29. The sprockets on the extreme ends of arms 26 and 26' are pivoted on stationary shafts 41 and 42, which are slightly inclined to facilitate a better grip upon the fruit or vegetable to be peeled (see Figs. 1 and 4). The hubs of the opposite sprockets are provided with suitable pins 108 and 109, to insure a still better grip upon the fruit or vegetable to be peeled.

The upper conveying bands or chains are made short to allow the feeding-in of the fruits or vegetables discharged from pocket 14. These bands are mounted on the extreme end of arms 27 and 27', upon movable levers 43 and 43', which in turn are pressed downward by springs 44 and 44' (Figs. 1 and 2) till stop pins 45 and 45', prevent any further movement. This arrangement as clearly shown in Fig. 1 is provided for aligning purposes and also to insure a positive grip upon the fruit or vegetable at the extreme discharging end of the conveyor belts. These short conveyor belts or chains are driven from shaft 29, by means of suitable sprockets 94 and 94', and belts or chains 95 and 95'.

4. The feeder part.

This part is provided to facilitate a positive feed of the fruit or vegetable into the peeling mechanism. It consists of a special arrangement as shown in Figs. 1, 2, 5, 6, 7 and 8. A centrally located chain 46, guided by sprockets 47, mounted upon a common support 48, and driven from shaft 28, at a very slightly higher speed than the conveying belts, by a belt or chain drive 49, carries at equal intervals three feed devices 50 (see Figs. 1, 5, 6, 7 and 8), pivoted upon pins 51, riveted into the chain 46. Each feed device consists of two parts, one the feed lever 58, of channel shape, one leg of which is formed into guide levers 58' and 58''; the other the pin lever 52, positioned inside the feed lever 50. This pin lever is provided with an operating finger 52', and two prick pins 53, passing through a suitable perforation 54, provided in feed lever 58. A special platform 55, mounted upon a bracket 48, and a special guide rail 56, mounted upon the base plate 1, complete the feeder equipment. (See Fig. 1.)

The operation of the feeding mechanism is as follows:

Assuming the position as shown in Fig. 1 which is just a moment before the fruit or vegetable is released. The pin lever 52, of feed device 50, is about to engage the lower end of the operating rod 23, which after engagement is gradually lifted up and thus releasing the fruit or vegetable, as described previously. At the moment of releasing the fruit or vegetable, feed lever 58, is in the position indicated in dotted lines (Fig. 1). This position is so arranged that the falling fruit or vegetable is placed directly in front of and carried along by the feed lever 58. In moving forward the guide fingers 58' and 58'' of feed lever 58, slide upon platform 55, thus locking feed lever 58, in its vertical position, as shown in Figs. 6 and 7. After moving still further till the fruit or vegetable is securely gripped by the upper conveyor belts, a stop 57, (Figs. 1 and 7) in platform 55, engages with operating finger 52', of pin lever 52, and same is forced against feed lever 58, whereby pins 53, are pushed into the fruit or vegetable (see Figs. 6 and 7), thus adding another positive grip upon the fruit or vegetable. Fig. 5, indicates the moment the fruit or vegetable is completely discharged. The feed device consisting of feed lever 58, and pin lever 52, are pushed out of engagement by a stop pin 59, mounted on bracket 48, as soon as guide finger 58'' leaves platform 55. In moving downward guide finger 58', will strike pin 60, located at the lower end of bracket 48, thereby turning the feed device 50, into a horizontal position, as shown in Fig. 1, where it will slide along guide rail 56. Guide rail 56, is so arranged as to force the feed device 50, into its vertical position, as shown in Fig. 1, thus completing the cycle of operations.

The peeling mechanism.

The peeling mechanism as shown in Figs. 1, 4, 9 and 10, comprises a stationary support 61, mounted upon base plate 1. A central opening in said support 61, provides space for a rotating drum 62, upon which a ball bearing 63, whose outer race ring 64, is stationarily fastened to support 61. Spur gear 65, fastened upon rotating drum 62, engages spur gear 10, of the drive. Another spur gear 66, is stationarily mounted upon the outer race ring 64, and engages a pinion 66', running upon a stationary shaft 67, and permanently connected to a bevel gear 68. Bevel gear 68, engages bevel gear 69, which in turn is fastened on a rotating shaft 70. Bevel gear 69, and shaft 70, are forming part of a movable, swinging arm 71, pivoted on shaft 67. A clock spring 72, whose inner end is permanently attached to shaft 67, and whose outer end is pressing against an abutment 73, of arm 71 serves the purpose of forcing swinging arm 71 and peeling tool 80 into intimate contact with the surface of the fruit or vegetable, to be peeled. Removable cover 74, enclosing pinion, bevel gears, pivot and spring parts, is so arranged as to perfectly protect all these parts from dust, dirt and water. For this purpose the portions 75, of swinging arm 71 are designed to perfectly close slot 76, of cover 74, through which swinging arm 71, protrudes, in no matter what position arm 71, may be.

To regulate the tension of clock spring 72, shaft 67, is provided with a slot 77, for a screw driver, and a plurality of adjusting holes 78, for pin 79, by which any desired adjustment may be accomplished. A specially designed peeling tool 80, made of non-metallic material as porcelain, glass, marble or composition, is removably mounted upon the lower end of shaft 70, a slot 81, in peeling tool 80, and a removable pin 82, passing through shaft 70, are practical means to facilitate attaching or detaching the peeling tool to or from the shaft 70.

Provision for two of such peeling tools is made as shown in Figs. 1 and 4, the planes of which are slightly displaced (Fig. 1) to permit a more efficient and speedier peeling. It is self-evident that any number of tools may be employed and arranged to increase the efficiency of the apparatus.

The operation of the peeling mechanism is as follows:

Rotating drum 62, is set in motion by spur gears 10 and 65. (See Figs. 1, 4, 9 and 10.) Pinion 66, mounted upon and forming a part of drum 62, is taken along and forced to rotate, and also transmit this rotation through bevel gears 68 and 69, to peeling tool 80. This peeling tool, which is mounted upon shaft 70, is running in a bearing formed by pivoted swinging arm 71. Peeling tool 80, and arm 71, are so arranged as to permit the gliding of tool 80, over any irregular surface (see Fig. 4). Tool 80, by means of its coarse or toothed surface, its rapid rotation and the pressure applied by clock spring 72, will perfectly peel or clean any surface of fruits or vegetables, which are moved forward and pushed into the peeling mechanism by the feeding mechanism described previously.

The discharging mechanism.

This mechanism comprises four short conveying belts or chains 83—83' and 84—84' (see Figs. 1, 2, 3 and 4). These belts are operated by chains or belts 85—85' and 86 and 86', located on the outside of arms 87—87' and 88—88', and driven by sprockets 100—100' and 101—101', fastened on shafts 89, and 90. These shafts are running in bearing 91, which is mounted upon end plate 92. Shaft 89, is driven by main shaft 5, through bevel gear pinions 8, 95, and 96, while a pair of spur gears 97 and 98, are transmitting power to shaft 90. Pivoted arm 87—87' and 88—88', are pulled together by springs 102 and 103, till stops 104—104' and 105—105', of the geared portions 106, 106', 107, 107', prevent any further motion.

The discharging mechanism operates as follows:

The fruit or vegetable, while still in the process of peeling is steadily pushed forward till the extreme ends of the belts or chains 83—83' and 84—84' have a firm grip upon the fruit or vegetable, whereby the pins 108 and 109, located on the hubs of the opposite sprockets (see Fig. 4) materially assist and guard against any possible twisting of the fruit or vegetable. Conveyor belts 83—83' and 84—84' gradually carry the fruit or vegetable along till the same drop off when the other end of the belt is reached. An opening 110, in base plate 1, is provided to facilitate the collecting or carrying off of the cleaned fruit or vegetable.

The washing mechanism.

The washing mechanism consists of a stationarily arranged water supply pipe 111, which continually or intermittently discharges a spray of water upon the fruit or vegetable in the process of peeling thus thoroughly cleaning the peeled fruit or vegetable. Waste and surplus water is carried off through an opening 112, provided for that purpose in base plate 1. The water supply is controlled by means of a suitable valve 113, which in turn is operated by a lever 114, gliding over covers 74, thereby automatically opening and closing valve 113. Lever 114, after gliding over covers 74, is returned to its normal position by means of either gravity or by a suitable spring (not shown in the drawings). In case a continued stream of water is desired, lever 114 is removed and the valve 113, set in the open position.

I do not wish to limit myself to the exact construction of the apparatus shown, it being apparent that there may be considerable variation in using the principles disclosed without departing from the spirit of my invention.

What I claim and desire to secure by Letters Patent is:

1. In an apparatus of the character described, the combination of a suitable automatically and periodically operated fruit or vegetable releasing mechanism, a suitable automatically operated conveyor type feeding mechanism, a suitable automatically operated rotating peeling and cleaning mechanism, a suitable automatically operated washing mechanism, a suitable automatically operated conveyor type discharge mechanism, and suitably arranged driving means for operating said mechanism.

2. In an apparatus of the character described, the combination of a suitable automatically operated fruit or vegetable locking and releasing mechanism, said releasing mechanism so arranged as to automatically release fruit or vegetables at a predetermined period of operation, and also lock or prevent the next following fruit or vegetable from being released; a suitable automatically operated conveyor type feeding mechanism, said feeding mechanism so arranged as to automatically adjust itself to the size and shape of the fruit or vegetable while automatically delivering said fruit or vegetable into a suitable peeling mechanism, said peeling mechanism so arranged as to remove the surface skin of said fruit or vegetable by means of a plurality of self-adjusting rotating non-metallic tools; a suitable washing mechanism, said washing mechanism automatically and intermittently spraying a stream of cleaning liquid upon said fruit or vegetable; a suitable automatically operated conveyor type fruit or vegetable discharge mechanism, said discharge mechanism so arranged as to automatically adjust itself to the size and shape of said fruit or vegetables, while automatically discharging said fruit or vegetables; and a suitable driving mechanism, said driving mechanism so arranged as to operate and transmit power to all of the various mechanism.

3. In an apparatus of the character described, an automatically and periodically operated fruit or vegetable locking and releasing mechanism, comprising a pivoted swinging release arm, said release arm provided with an operating lever extending beyond the fulcrum of said release arm, and a pivoted locking arm forming an integral part of said releasing mechanism and operated simultaneously with same.

4. In a fruit or vegetable locking and releasing mechanism, the combination of a release arm pivoted on a stationary shaft, an extension provided on said release arm for the purpose of operating same, a spring or other suitable means holding said operating arm in its normal position, a locking arm pivoted on said shaft and normally held in position by a spring or other suitable means, connecting said locking arm and said release arm, said spring causing said locking arm to function when release arm is operated.

5. In a fruit or vegetable peeling apparatus, the combination of a fruit of vegetable locking and releasing mechanism of the character described, said locking and releasing mechanism periodically operated by a suitable automatic feeding mechanism, said feeding mechanism so arranged as to periodically and automatically engage said releasing mechanism by means of a suitable operating mechanism, to discharge said fruit or vegetables upon a suitable conveying mechanism.

6. In an apparatus of the character described, the combination of a conveying mechanism comprising a suitable self-adjusting belt or chain type conveyor, suitable movable arms supporting and guiding said conveyor, and suitable interconnecting means to centrally adjust said movable arms and conveyor.

7. In a fruit or vegetable mechanism, the combination of two pairs of pivoted lower and upper arms, each pair of upper and lower arms mechanically interconnected and centrally operated, by means of suitable means, suitable interlocking pulling means to normally hold said lower and upper arms in close engagement, suitable conveyor belts or chains movably fastened to said lower arms, said conveyor belts or chains so arranged as to receive the discharged fruit or vegetables, a pair of short conveyor belts or chains independently mounted upon suitable levers, said levers pivoted upon the extreme end of said upper arms, suitable means interposed between said levers and said upper arms to facilitate proper alignment to said fruit or vegetables and suitable operating means for said short conveyor belts or chains.

8. In a fruit or vegetable peeling and washing apparatus, the combination of a suitable locking and releasing mechanism, of the character described, a suitable fruit or vegetable conveying mechanism of the character described, and a suitable feeding mechanism, said feeding mechanism forming an integral part of said releasing and conveying mechanism, mechanically interlinked and periodically operating said releasing and conveying mechanism.

9. In a feeding mechanism, the combination of a plurality of feeding levers, said feeding levers mounted and carried upon an endless chain or belt, a suitably arranged platform engaging and actuating said feeding levers, and a suitable release lever operating attachment, periodically actuated by said feeding levers.

10. In a fruit or vegetable peeling and washing apparatus, the combination of a suitable locking and releasing mechanism, a suitable conveying mechanism, a suitable feeding mechanism, all of the character described, and a suitable fruit or vegetable peeling and washing mechanism, said peeling and washing mechanism forming an entirely independent and self-contained unit of the equipment, comprising a stationary bracket, a rotating drum, a plurality of rotating gear transmissions carried by said drum, a plurality of rotating non-metallic peeling tools, actuated by said rotating gear transmission, and a suitable spraying equipment for washing said fruit or vegetable.

11. In a fruit or vegetable peeling mechanism, the combination of a stationary bracket, a rotating drum, said rotating drum connected by suitable ball bearings to said stationary bracket, gear or other suitable operating means for actuating said rotating drum, a stationary gear suitably mounted on said stationary bracket, a plurality of suitable transmission gears mounted upon said rotating drum, said transmission gears operating a plurality of removable and interchangeable non-metallic peeling tools, said peeling tools movably fastened to suitable self-adjusting pivoted guide arms.

12. In a fruit or vegetable peeling mechanism, the combination of a suitable non-metallic rotating peeling tool, a suitable pivoted swinging arm to carry and support said peeling tool, a suitable gear mechanism to operate said peeling tool and a suitable adjustable spring or other tension arrangement for said pivoted swinging arm and all operating and tension parts suitably dustproof enclosed.

13. In a fruit or vegetable peeling and washing mechanism, the combination of a peeling mechanism of the character described, and a washing attachment comprising a rigidly supported pipe arrangement and an automatically controlled valve mechanism for automatically and intermittently spraying and washing fruit or vegetables.

14. In a fruit or vegetable peeling and washing apparatus, the combination of a suitable locking and releasing mechanism, a suitable conveying and feeding mechanism, a suitable peeling and washing mechanism, all of the character described, and a suitable fruit or vegetable discharge mechanism, said discharge mechanism forming an independent unit of the equipment comprising two pair of pivoted self-adjusting upper and lower arms, suitable conveyor belts or chains movably mounted upon said upper and lower arms, and suitable operating means for said fruit or vegetable discharge mechanism.

15. In a fruit or vegetable discharge mechanism, the combination of two pair of pivoted upper and lower arms, each pair of upper and lower arms mechanically interconnected and centrally operated by suitable interlocking means, suitable pulling means to normally hold said upper and lower arms in close engagement, suitable conveyor chains movably fastened to said upper and lower arms, and suitable operating means for said conveyor chains.

Signed at New York city in the county of New York and State of New York this 28th day of June, A. D. 1924.

BENJAMIN MEISLER.